United States Patent
Viken

[11] Patent Number: 6,082,416
[45] Date of Patent: Jul. 4, 2000

[54] FLUID EXCHANGE APPARATUS

[76] Inventor: James P. Viken, 9890 Crestwood Ter., Eden Prairie, Minn. 55347

[21] Appl. No.: 09/235,560

[22] Filed: Jan. 22, 1999

Related U.S. Application Data

[60] Provisional application No. 60/072,403, Jan. 23, 1998, provisional application No. 60/071,884, Jan. 23, 1998, provisional application No. 60/098,853, Sep. 2, 1998, provisional application No. 60/100,895, Oct. 23, 1998, and provisional application No. 60/072,289, Jan. 23, 1998.

[51] Int. Cl.[7] .............................. F16C 3/14; F16N 33/00
[52] U.S. Cl. ............................ 141/98; 141/65; 141/95; 184/1.5
[58] Field of Search ................................ 222/213, 386.5, 222/389; 141/98, 67, 94, 95, 198, 59, 65; 184/1.5; 137/625.68

[56] References Cited

U.S. PATENT DOCUMENTS

| | | | |
|---|---|---|---|
| 5,318,080 | 6/1994 | Viken | 141/98 |
| 5,361,870 | 11/1994 | Courcy | 184/1.5 |
| 5,447,184 | 9/1995 | Betancourt | 141/98 |
| 5,472,064 | 12/1995 | Viken | 184/1.5 |
| 5,522,474 | 6/1996 | Burman | 184/1.5 |
| 5,871,068 | 2/1999 | Selby | 184/1.5 |

*Primary Examiner*—Henry J. Recla
*Assistant Examiner*—Peter deVore
*Attorney, Agent, or Firm*—Larkin, Hoffman, Daly & Lindgren, Ltd.

[57] ABSTRACT

A system and method for exchanging used hydraulic fluid with fresh hydraulic fluid in an accessed hydraulic fluid system. The system including a fluid exchange assembly having a fluid receptacle and an interior fluid separation member, which may be a distendable diaphragm member. The exchange system further includes features of automatic fluid flow alignment, an exchange mode indicating system, and a bypass system for removing at least a portion of the exchange system during a bypass mode of operation.

21 Claims, 8 Drawing Sheets

FLUID EXCHANGE APPARATUS

RELATED APPLICATIONS

This application claims the benefit of priority pursuant to 35 USC §119(e)(1) from the provisional patent applications filed pursuant to 35 USC §111(b): as Ser. No. 60/072,403 on Jan. 23, 1998, Ser. No. 60/071,884 on Jan. 23, 1998, Ser. No 60/098,853 on Sep. 2, 1998, and Ser. No. 60/100,895 on Oct. 23, 1998 and Ser. No. 60/072,289 Jan. 23, 1998.

BACKGROUND OF THE INVENTION

1. Field of the Invention

The present invention relates to hydraulic fluid exchanging devices, and more particularly to an apparatus and method of use for achieving a fluid exchange for an automotive automatic transmission.

2. Description of the Prior Art

The market environment for automatic transmission fluid exchange systems has undergone relatively rapid recent expansion. Many such devices have been developed for such use. One unresolved problem has been the inherent need for an inexpensive fluid exchanger which is simple to operate and which supports desirable features of some known, more complex and expensive exchange units, such as the bypass and flow alignment mechanisms as disclosed in U.S. Pat. No. 5,472,064 to Viken. Viken discloses a flow alignment device for aligning the flow of fluid within the fluid circulation circuit of the transmission with a proper flow of fluid within the exchange device. Additional desirable features include an indicating system to notify the operator of the device's different modes of operation. These modes may include a fresh fluid filling mode, a fresh fluid completion mode, a fluid exchange mode, and a fluid exchange completion mode of operation. Another limitation of single receptacle fluid exchangers is the relatively tedious process of changing from a standard fresh fluid type to another specialty type fluid. Yet another limitation has been time consuming fluid exchanges for vehicles with low flow rate transmissions. Yet other transmissions provide slow flow rate under certain conditions (such as cold ATF fluid) which limits the operability of the displacement type fluid exchangers.

SUMMARY OF THE INVENTION

Addressing the deficiencies of the conventional art, the instant invention resolves the problems in an efficient, and cost effective manner. The present invention provides a simple, easy to operate, inexpensive fluid exchanger for automatic transmissions or hydraulic circulating systems and the like of vehicles, machinery, aircraft and equipment. The fluid exchange system includes numerous desirable features, including a flow alignment correction device, a bypass device for removing a portion of the exchange device from the fluid exchange process, and proximity sensors which detect the presence of or absence of a retained separation member of the exchange device. The proximity sensors relay information that the fluid receptacle is either full of fresh fluid or spent fluid. Additionally, a proximity operated bypass valve assembly is used to automatically transfer the mode of operation from fluid exchanging to a bypass mode wherein the incoming spent fluid conduit is coupled to the outgoing fresh fluid supply conduit. The fluid bypass circuit protects the transmission from disruption of fluid circulation in its cooling circuit when the fresh fluid supply of the unit is depleted. An optional external pump pack can be used to fill a portion of the device with and empty the device. The optional external pump pack can also be used to provide boost to either the incoming spent fluid conduit and the outgoing fresh fluid supply conduit to speed up the fluid exchange by augmenting the flow through the invention if a very low flow automatic transmission is being serviced.

The proximity indicating system is implemented to notify the operator by light and tone when the device is depleted of its fresh fluid supply and has entered the bypass mode of operation. Similarly, the proximity indicating system may indicate, during filling of fresh fluid, that the fresh fluid portion of the receptacle is filled with fresh fluid while the spent fluid portion is depleted. For enhanced portability, the LEDs and associated indicating circuitry may be battery operated.

Additionally, the instant invention provides effective, inexpensive means to obtain fluid flow alignment between the device and the hydraulic fluid circulation system. A low resistance combination flow meter/sightglass is utilized to provide the operator with an indicator of proper fluid flow through the system in the exchange mode and the subsequently utilized bypass mode.

A further feature of the present invention is the optional pump pack which provides a safe and rapid means of recharging the unit for a subsequent fluid exchange without using a forced-feed bulk fluid supply system. The optional pump pack may also be used to provide boost of the fluid flow otherwise provided solely by the internal pump of the transmission being serviced. Boost power can be especially useful for some low flow or low pressure situations.

The above and other objects, features, and advantages of the present invention are further disclosed in the following detailed description in conjunction with the drawings.

DESCRIPTION OF PREFERRED EMBODIMENTS

Figure 1:
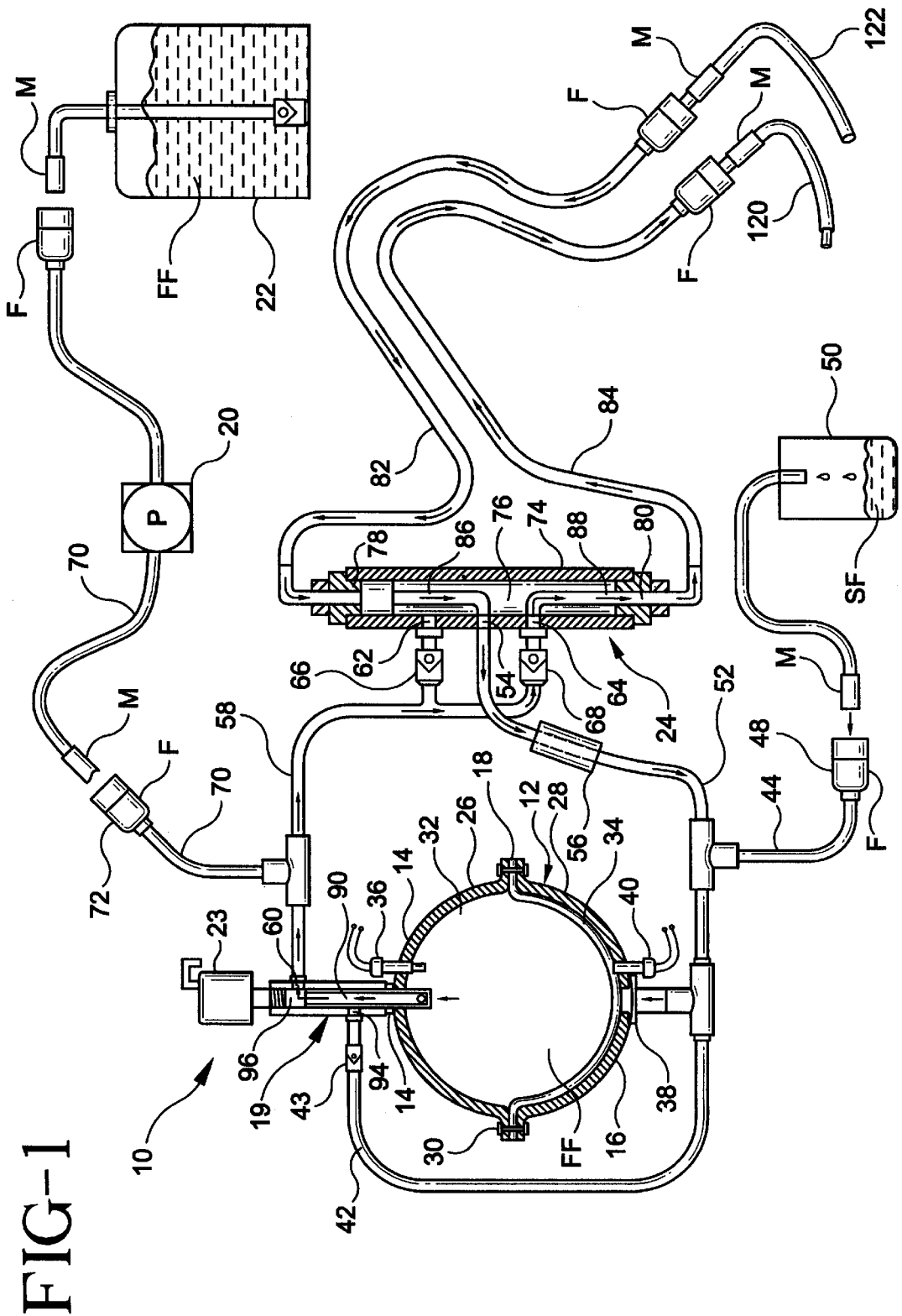
FIG. 1 is schematic view of a fluid exchange system according to the present invention illustrating a full fresh fluid portion of the fluid receptacle and operating in an initial fluid exchange mode of operation.
Figure 2:
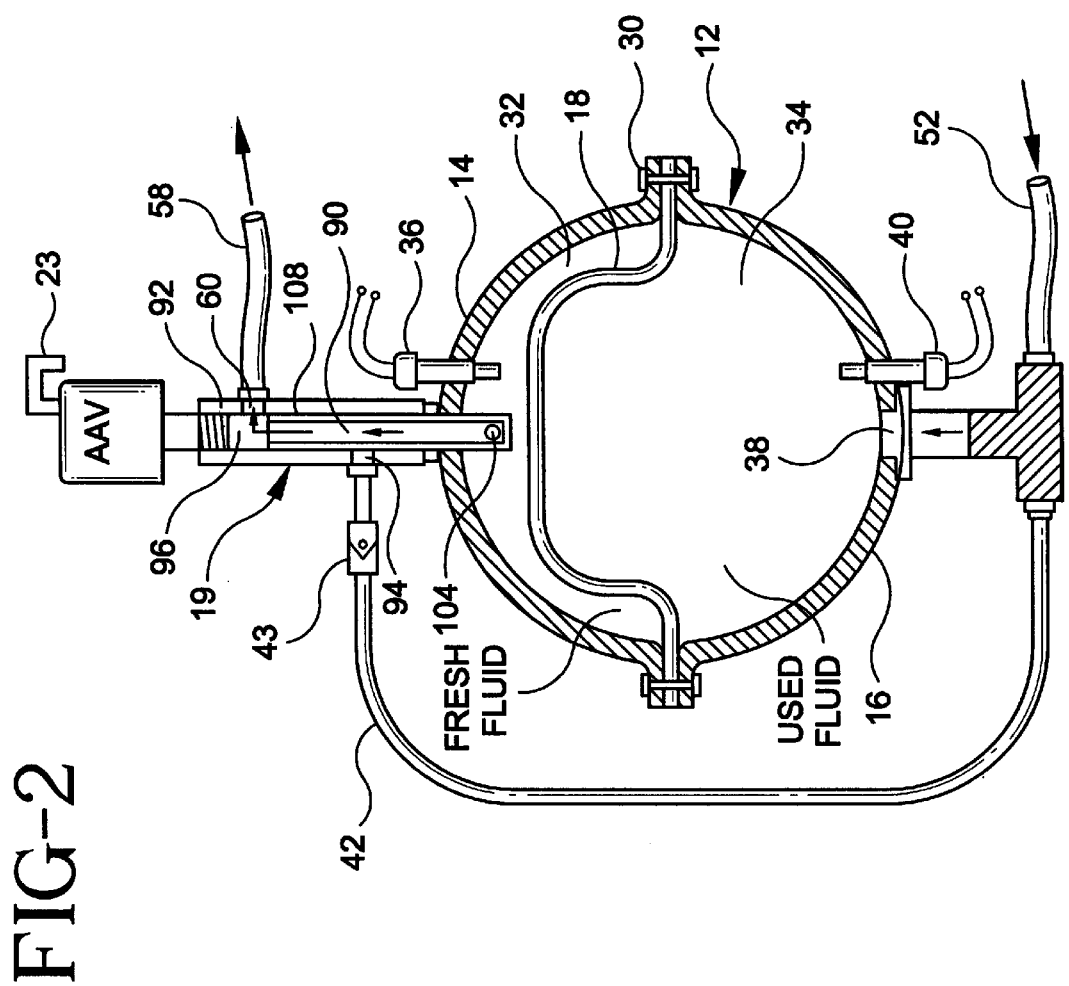
FIG. 2 is schematic view of a portion of the fluid exchange system of FIG. 1 operating in an fluid exchange operation.
Figure 3:
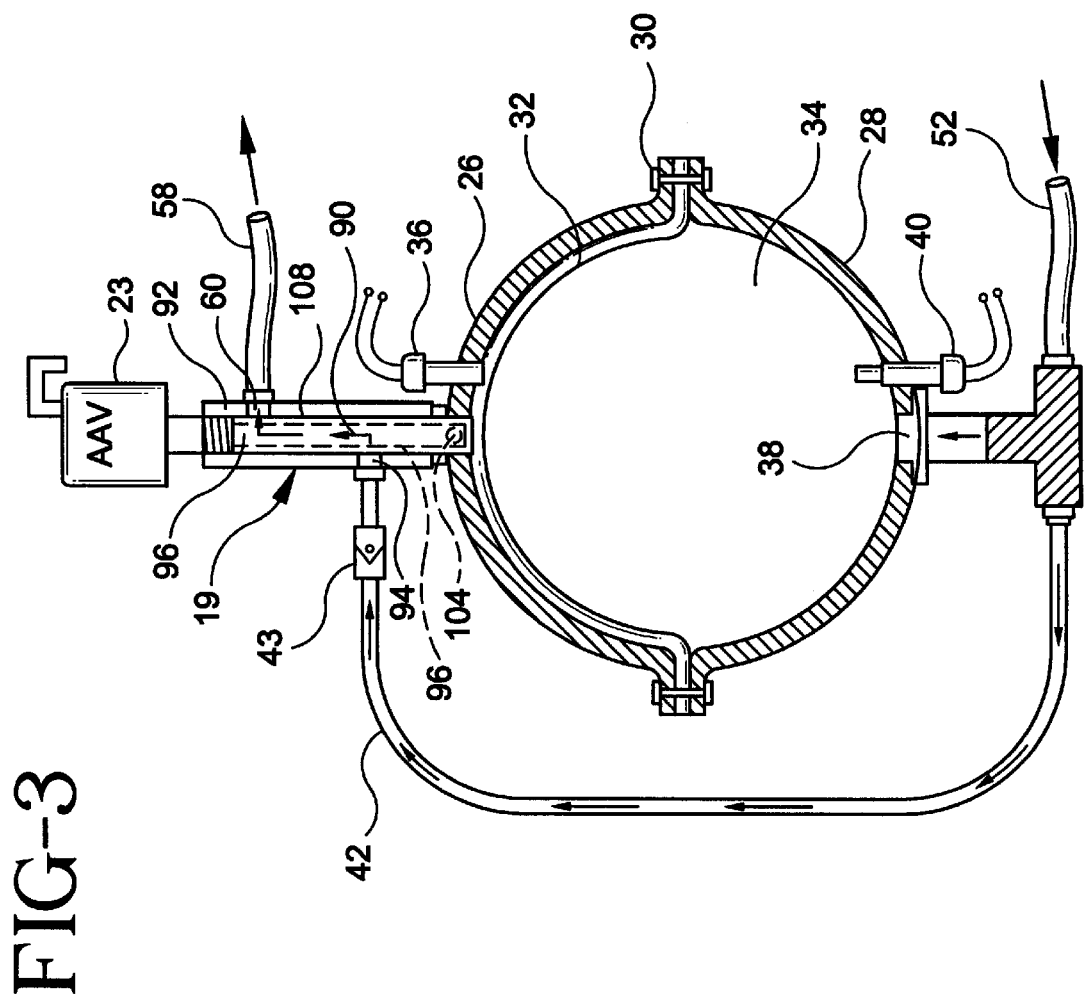
FIG. 3 is a schematic view of a portion of the fluid exchange system of FIG. 1 operating in a bypass mode of operation.
Figure 4:
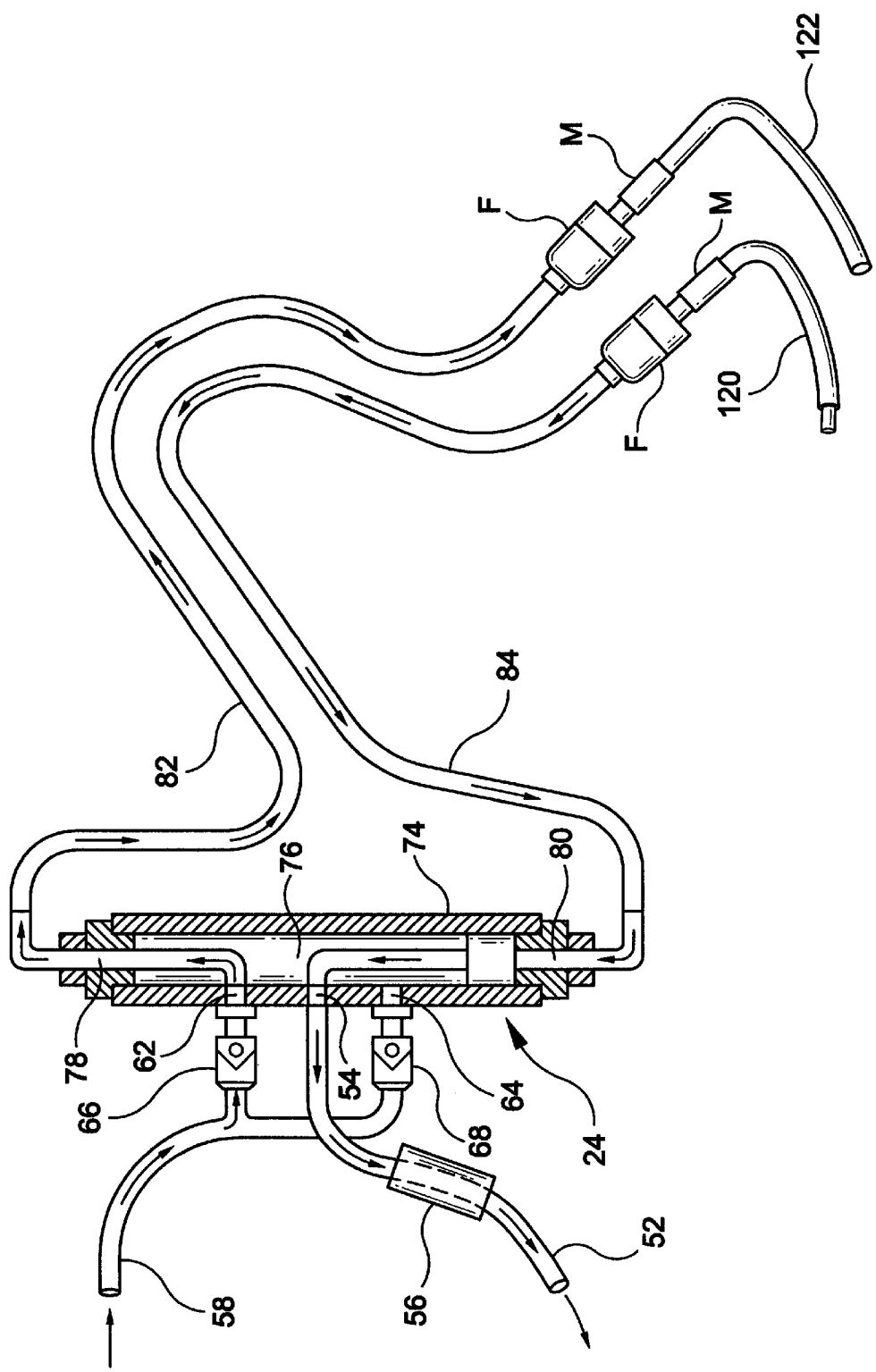
FIG. 4 is a schematic diagram of a portion of the fluid exchange system of FIG. 1, specifically illustrating operation of the flow alignment assembly.

Referring now to the drawings, where like numerals represent like parts throughout, FIGS. 1–3 are schematic views of fluid exchange system 10 according to the present invention. FIG. 1 represents the exchange system 10 in an initial exchanging mode of operation. FIG. 2 represents the exchange system 10 also in the exchanging mode of operation, though after a passage of a period of time. Finally, FIG. 3 illustrates the exchange system 10 in the bypass mode of operation. The exchange system 10 includes a fluid receptacle 12 having a first end 14 and a second end 16 and an intermediate separation member 18, which though illustrated herein is a flexible diaphragm member, may be a piston or similar movable structure. The exchange system 10 further includes a bypass assembly 19, an auxiliary pump 20, a remote source of fresh hydraulic fluid 22, and a flow alignment device 24 for aligning the flow of fluid within the exchange system 10 with that established within the transmission circuit (not shown). An automatic air release valve 23 may be coupled to the fluid exchange apparatus 10 to remove accumulated entrained air of the fluid. It may be appreciated by those skilled in the art that the exchange system 10 of the present invention, while described herein in a preferred application for use with automotive automatic transmission, may be suitable for fluid exchange purposes for a variety of hydraulic systems, such as vehicles, airplanes, tractors, stationary hydraulic systems, etc.

A receptacle assembly 12 includes a pair of tank halves 26, 28 which maintain a flexible rubber diaphragm 18. Tank half 26 and tank half 28 are secured by fasteners 30 distributed around the circumferential lip of each tank half 26, 28. Tank halves 26 and 28 are of spun steel, but may also be constructed of deep drawn steel or alternative metals. Tank halves 26 and 28 may also be constructed of molded plastic compounds which are resistant to the effects of ATF. Other alternative means to secure a Diaphragm 18 inside a middle circumference of a molded or welded tank assembly 12 without combining to tank halves 26, 28 are well known in the hydraulic art. Such as, but not limited to compression rings forced against a middle circumferential protrusion, etc. Diaphragm 18 is molded of an Automatic Transmission Fluid (ATF) resistant material such as Buna-N (Nitrile), Viton, or any material which is significantly resistant to mineral based oils or the particular fluid being exchanged. Diaphragm 18 is elastically deformable to distend toward either side of tank assembly 12. Diaphragm 18 provides minimal resistance to fluid flow within the tank 12.

Still referring to FIG. 1, the receptacle 12 includes a fresh fluid portion 32 and a used fluid portion 34 defined by the relative position of the diaphragm 18. The fresh fluid portion 32 of FIG. 1 includes substantially the entire inner volume of the receptacle 12. The fresh fluid portion 32 is fluidly coupled to a portion of the bypass control assembly 19 and to a proximity sensor 36. The used fluid portion 34 is fluidly coupled to a used fluid inlet port 38 and a proximity sensor 40. A bypass conduit 42 is coupled between the used fluid inlet port 38 and the bypass control assembly 19. Bypass conduit 42 includes a check valve 43 which fluid flow in a reverse direction, especially during the fresh fluid filling procedure. The used fluid inlet port 38 is further coupled to a used fluid expulsion conduit 44 having a quick coupling connector 48. Used fluid expulsion conduit 44 may be connected to deliver used fluid to a used fluid receptacle 50. Used fluid inlet port 38 is fluidly coupled via conduit 52 to a central outlet port 54 of the flow alignment structure 24. Conduit 52 includes a sight gage 56 which may provide flow rate information. If sightglass/flowmeter 56 shows minimal flow the procedure may be terminated by the operator.

The proximity sensor 36 of the fresh fluid portion 32 is illustrated in its disengaged position, while the proximity sensor 40 of the used fluid portion 34 is illustrated in its engaged position. As described hereinafter, the proximity sensors 32, 34 are mechanically actuated sensors which respond to move under forces of the diaphragm 18. Other proximity sensors 32, 34 are envisioned, and may be appreciated by those skilled in the art. Such alternative proximity sensors 32, 34 may include electronic sensors, such as Hall-Effect sensors, or optical sensors which respond to the physical presence of the diaphragm 18 near the sensor, though which may not necessarily rely on a physical contact with the diaphragm to operate.

Bypass control assembly 19 supports an output flow of fresh fluid via conduit 58 from the fresh fluid portion 32 of the receptacle 12 during the operational mode. Fresh fluid is conducted through the bypass control assembly 19, through an outlet port 60 and delivered via conduit 58 to a pair of fresh fluid inlet ports 62, 64 of the flow alignment device 24. Check valves 66, 68 are coupled within the conduit 58 to limit the direction of fluid flow within conduit 58. Additionally, bypass control assembly 19 outlet port 60 may be is coupled to the external pump assembly 20 via conduit 70 and quick connect coupler 72. The pump 20, in turn, may be fluidly coupled to the fresh fluid storage receiver 22.

The flow alignment structure 24 includes a valve body 74 and an interiorly received valve 76 which is slidably movable within the valve body 74 in response to pressure differential therein. Valve body 74 further includes pair of opposed fluid ports 78, 80 which are separately coupled via respective conduits 82, 84. Fluid access to the transmission cooling is obtained via conduits 82 and 84. The valve 76 of the flow alignment structure 24 includes a pair of independent fluid passageways 86, 88. A sealing structure (not shown) may be intermediate the interface between the valve 76 and valve body 74. Alternatively, tolerances between the valve 76 and valve body 74 may be minimized to limit the amount of fluid losses across the interface and between the ports 54, 62, 64, 78, 80 of the device.

Figure 5:
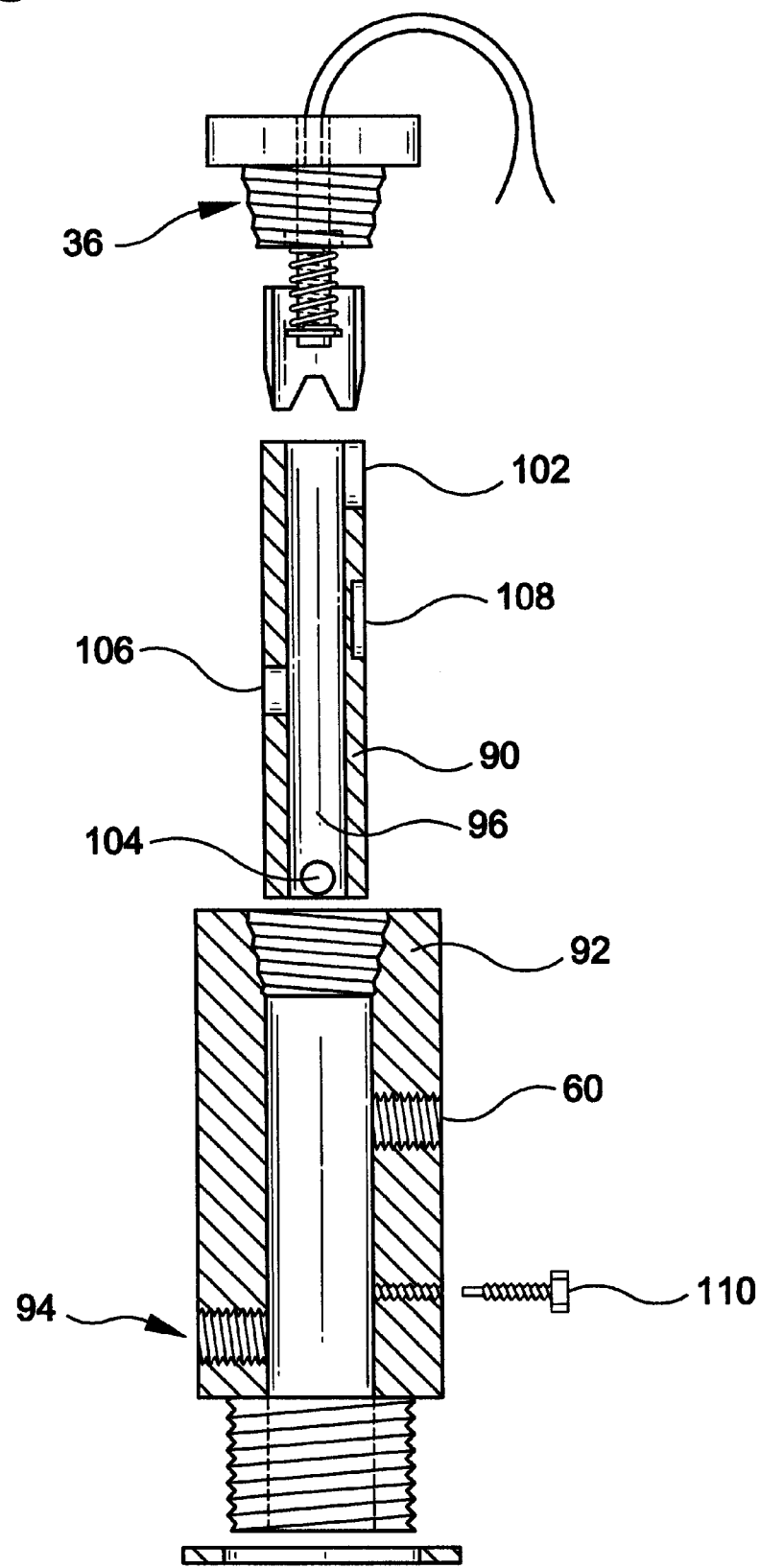
FIG. 5 is a detailed exploded schematic view of a portion of the bypass assembly of FIG. 1.
Figure 6:
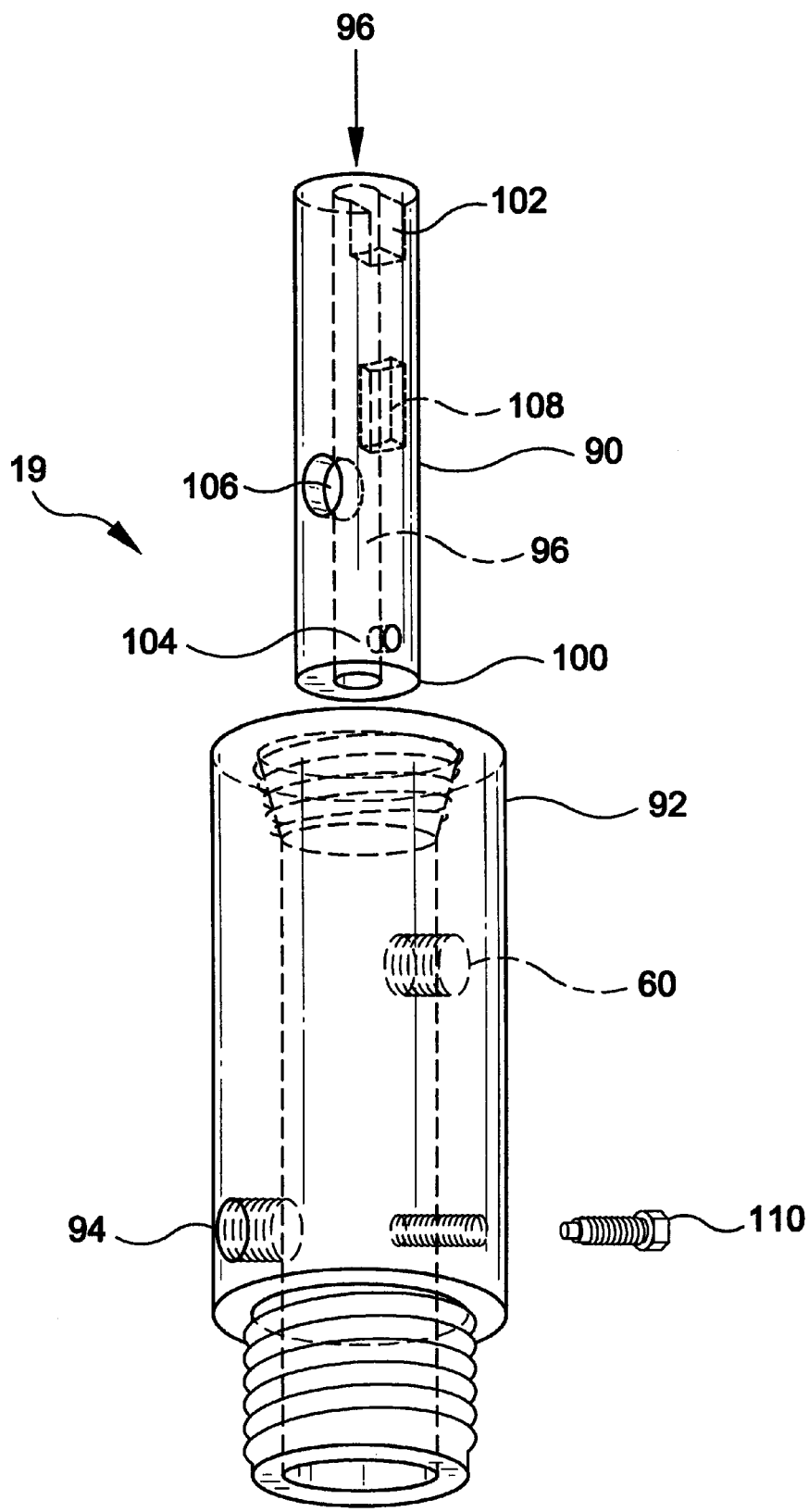
FIG. 6 is detailed exploded perspective view of a portion of the bypass assembly of FIG. 1.

Referring now to FIGS. 5 and 6, the bypass assembly 19 is further illustrated to include a bypass slide valve 90 and bypass valve body 92. Bypass valve body 92 is threadedly secured to the fluid receptacle 26 so that the interiorly-received bypass slide valve 90 may be selectively engaged by the diaphragm 18. Bypass valve body 92 includes bypass inlet port 94 and a bypass outlet port 60. Cylindrical bypass slide valve 90 includes a central hollow fluid passage 96 which is opened at one end 100 to the fresh fluid portion 32 of the receptacle 12. The mass of bypass slide valve 90 assumes a position as indicated in FIGS. 1 and 2. A spring may be included therein to maintain the undeployed position of the valve 90 as in FIGS. 1 and 2. The opposed end 102 of slide valve 90 is similarly open and includes a slot passageway providing fluid communication between the interior of valve 90 and bypass port 60. Bypass slide valve 90 further includes a fresh fluid inlet 104 port providing fluid communication from the interior 96 of the bypass slide valve 90 to its exterior. Bypass slide valve 90 further includes a fluid port 106 which may be aligned for fluid communication with bypass valve body port 94. A keyway 108 is defined along the length of the bypass valve 90 and engages a key fastener 110 to prevent the bypass slide valve 90 from rotating along its axis, and otherwise maintains the bypass slide valve 90 within the bypass valve body 92. FIG. 5 additionally illustrates an alternative embodiment of proximity sensor 36, in which the proximity sensor is trigger by movement of the slide valve 90 as the diaphragm 19 contacts the valve 90.

Operation of a Preferred Embodiment

Referring again to FIGS. 1–3, operation of the exchange system may be described. FIG. 1 illustrates the exchange system 10 as interconnected to the cooling circuit of a transmission through accessed cooling conduits 120 and 122. As an aside, the full fresh fluid condition of the exchange system as illustrated in FIG. 1 has been achieved by coupling the external pump 20 to the to fresh fluid supply reservoir 22 to force fresh fluid into the fresh fluid portion 32 of the receptacle 12. As fresh fluid is introduced by the pump 20 through port 60 of the bypass assembly 19, through the interior of the bypass slide valve 90 and into the fresh fluid portion 32 of the receptacle 12, used fluid is forced out of the receptacle 12 and into a previously coupled used fluid reservoir 50. Proximity sensor 40 is triggered by the diaphragm 18 and a proximity control circuit 140 may indicate to the user the fresh fluid full condition to the operator through a visual indicator, such as a LED 144, and/or through generation of an audible warning tone. Prior to normal operation, pump 20 is removed from the exchange system 12. Alternatively, filling of fresh fluid may be accomplished via a pressurized fluid delivery line(not shown), such as typically found in service stations.

Fluid direction through the flow alignment conduits 82 and 84 is established by the flow present in the cooling circuit. As appreciated by those skilled in the art, the flow alignment conduits 82, 84 may be randomly intercoupled to the cooling circuit 120, 122 of the transmission without regard to particular specific internal transmission flow directions. Fluid flow in the exchange system 10 is indicated by arrows within fluid conduits. As a result, used fluid flows from the transmission cooling circuit through conduit 82 and enters the flow alignment structure 24 at port 78. Valve 76 of flow alignment structure 24 is displaced under used fluid pressure which results in fluid coupling between port 78 and port 54. Used fluid thus flows through conduit 52 and enters the used fluid portion 34 of the receptacle 12. As described hereinafter, used fluid during the exchange mode of operation is restricted from flowing through conduit 42 by operation of the bypass assembly 19.

The fluid exchange procedure continues, as illustrated in FIG. 2, with the used fluid flow resulting in a corresponding fresh fluid outflow from the receptacle 12. Fluid flow through bypass conduit 42 is restricted during the exchange mode by operation of the bypass control assembly. More specifically, inlet port 94 is not aligned with port 106 of the bypass slide valve 90, but is blocked by the valve 90.

The fluid exchange procedure continues, as illustrated in FIG. 3, until the fresh fluid portion 26 of the fluid receptacle 26 is depleted. Diaphragm 18 is fully distended and adjacent the upper wall 14 of the receptacle 26. Bypass control assembly 19 is actuated by the distended diaphragm 18 to couple fluid conduit 42 to fluid conduit 58. In this manner, the fluid exchange receptacle is removed from the assembly and fluid expelled from vehicle conduit 122 is routed through the assembly and returned through fluid conduit 120. Fluid passes through bypass assembly 19 by passing through port 94, through aligned port 106 and out port 60 of the bypass assembly 19.

Figure 8:
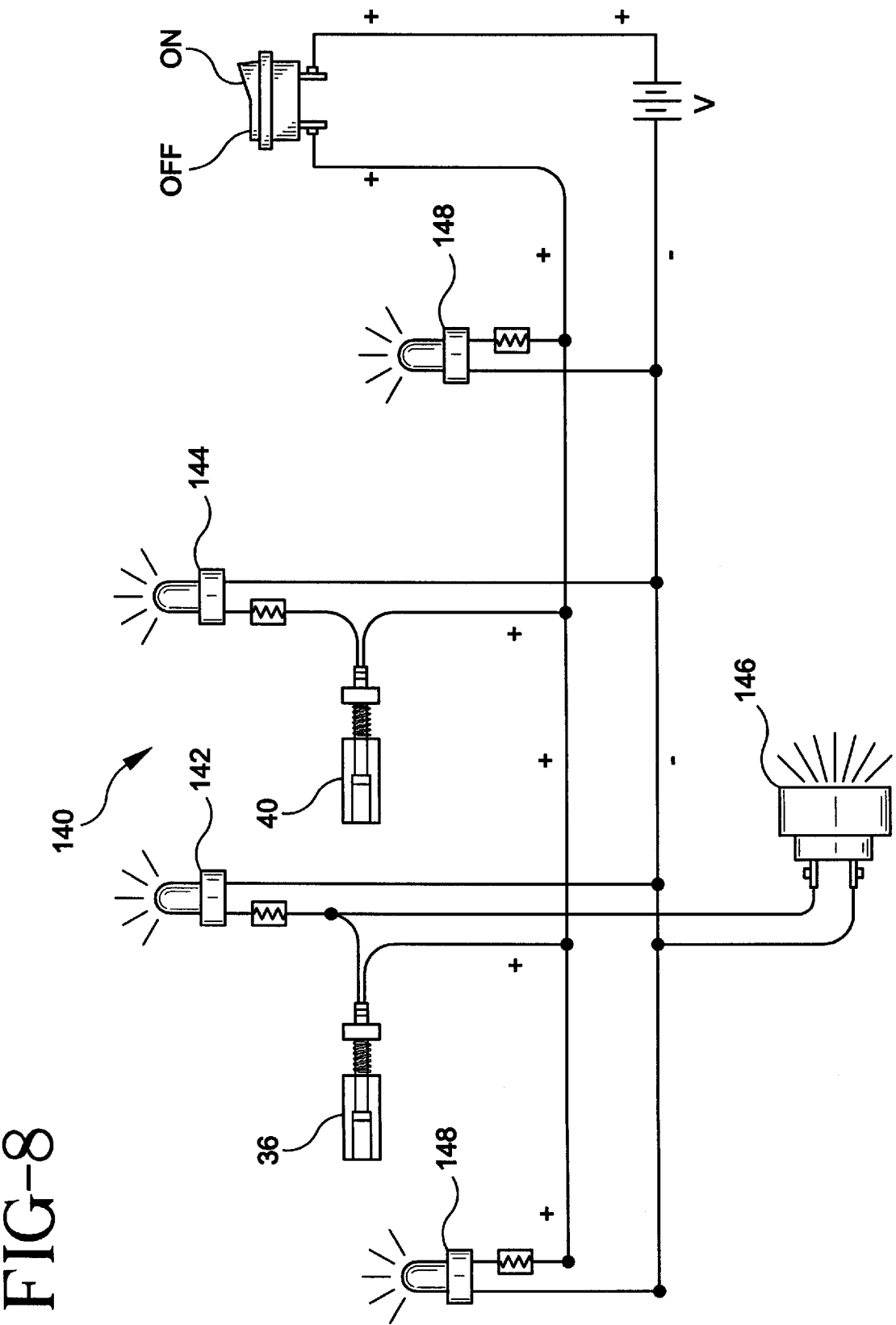
FIG. 8 is a diagrammatic view of the electrical proximity indicating circuitry according to the present invention.

When in the bypass mode of operation, the proximity sensor 36 is triggered by the diaphragm 18. An auditory tone may be generated and /or visible indication may be displayed to the operator. In one embodiment of the proximity control circuitry, as illustrated in FIG. 8, the triggering of the proximity sensor 36 results in a visible indicator through LED 142 to the operator and an audible tone through buzzer 146. The circuitry of FIG. 8 further includes a pair of LED's 148 for backlighting the sightglass 56.

Figure 7:
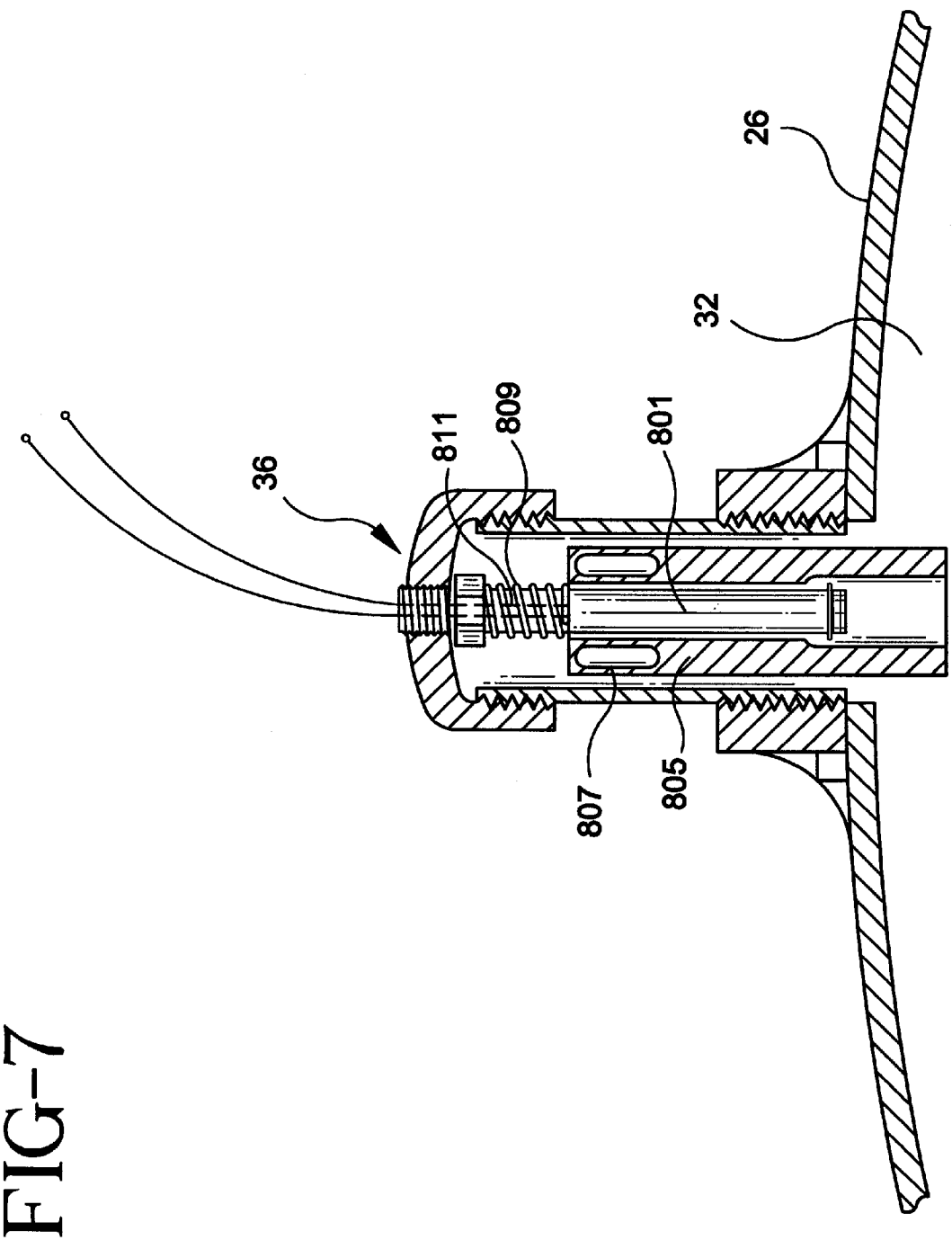
FIG. 7 is a detailed schematic view of a proximity sensor of FIG. 1.

Referring now to FIG. 7, one embodiment of the proximity sensor 36 is illustrated to include a sliding sleeve 805 which is slidingly engages on an electric reed switch body 801 by a snap ring 803 and a return spring for slide 809 is inserted on switch body 801. Magnets 807 are secured to slide 805. Sleeve 805 and retained magnets 807 are displaced along the length of slide 801 to compress spring 809 when sleeve 805 is deflected by diaphragm 19. This movement of magnets 807 relative to a reed switch 811 within the switch body 801 results in the closing of the reed switch 811. Alternative proximity sensors will be apparent to those skilled in the art, and may include, for example, LEDs-based distance measurement circuits, Hall-Effect devices, or electro-optical devices.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

I claim:

1. A fluid exchange system for use in exchanging a used fluid with a fresh fluid in a hydraulic system having a cooling circuit operatively connected to conduct a circulated fluid therein the hydraulic system, said used fluid initially being contained within said fluid cooling circuit, said fluid exchange system comprising:

a fluid receptacle having a separation member therein; said separation member being movable to define a fresh fluid portion of the fluid receptacle and a used fluid portion of the fluid receptacle;

a first conduit adapted to fluidly couple the used fluid portion of the receptacle to the cooling circuit to conduct a pressurized used fluid from the fluid cooling circuit, said pressurized used fluid causing a movement of the separation member within the fluid receiver;

a second conduit adapted to fluidly couple the fresh fluid portion of the receptacle to the cooling circuit to conduct fresh fluid to the fluid cooling circuit; and a bypass control mechanism operatively connected to the fluid receiver, said bypass control mechanism being activated by a movement of the separation member within the fluid receiver, said bypass control mechanism adapted to remove the fluid receptacle from the cooling circuit.

2. A fluid exchange system according to claim 1, wherein the fluid receiver includes an upper wall portion and a lower wall portion, and wherein the separation member may be disposed substantially adjacent the upper portion or the lower portion or at an intermediate position therebetween.

3. A fluid exchange system according to claim 2, wherein the bypass control mechanism is disposed at either the upper wall portion or the lower wall portion or at both.

4. A fluid exchange system according to claim 3, wherein when the separation member is disposed at the lower wall portion, the control mechanism is actuated to trigger a visible signal relating to a fresh fluid full mode of operation.

5. A fluid exchange system according to claim 3, wherein when the separation member is disposed at the upper wall portion, and the control mechanism is actuated to trigger a visible signal relating to a used fluid full mode of operation.

6. A fluid exchange system according to claim 2, wherein the activation of the bypass control mechanism triggers either a visible or auditory alert.

7. A fluid exchange system according to claim 1, wherein the bypass control mechanism is activated by a physical contact of the separation member with at least a portion of the bypass control mechanism.

8. A fluid exchange system according to claim 1, wherein the bypass control mechanism is activated by either an electrical response or an optoelectrical response to a presence to or absence from the separation member proximate the bypass control mechanism.

9. A fluid exchange system according to claim 1, wherein an output flowrate of fresh fluid introduced into the cooling circuit and the flowrate of used fluid extracted from the cooling circuit are substantially equal.

10. A fluid exchange system according to claim 1, wherein the separation member is a flexible diaphragm member secured around its periphery within the fluid receptacle.

11. A fluid exchange system according to claim 1, further comprising:
   a pump coupled to the fluid receptacle and supply an amount of fresh fluid from an external source to the fresh fluid portion of the receptacle during a refill mode of operation.

12. A fluid exchange system exchanging an amount of used fluid in a hydraulic system with a corresponding amount of fresh fluid, said fluid exchange system comprising:
   a receptacle having first and second ends and a movable separation member therein defining a used fluid chamber and a fresh fluid chamber, said fresh fluid chamber containing the amount of fresh fluid;
   a first conduit for receiving used fluid from the hydraulic system and introducing said used fluid to the used fluid chamber;
   a second conduit for receiving at least a portion of the amount of fresh fluid and introducing said at least a portion of the amount of fresh fluid to the hydraulic system;
   a proximity sensor for indicating a proximity of the separation member to either the first end or the second end; and
   a bypass control system for receiving the indication of proximity from the proximity sensor and bypassing the used fluid from being introduced into the used fluid chamber.

13. A fluid exchange system according to claim 12, further comprising a pair of proximity sensors.

14. A fluid exchange system according to claim 12, wherein the proximity sensor is a diaphragm actuated device.

15. A fluid exchange system for use in exchanging a used fluid with a fresh fluid in a hydraulic system having a cooling circuit operatively connected to conduct a circulated fluid therein the hydraulic system, said used fluid initially being contained within said fluid cooling circuit, said fluid exchange system comprising:
   a fluid receptacle having a separation member therein, said separation member being movable to define a fresh fluid portion of the fluid receptacle and a used fluid portion of the fluid receptacle;
   a flow control mechanism having at least a pair of inlet ports and at least a pair of outlet ports, said flow control mechanism having a valve body and an interiorly-received valve member, said valve member being slidably movable therewithin;
   a first conduit fluidly coupling the used fluid portion of the receptacle to a one of the at least a pair of outlet ports of the flow control mechanism to conduct a pressurized used fluid from the flow control mechanism;
   a second conduit fluidly coupling the fresh fluid portion of the receptacle to another one of at least a pair of outlet ports of the flow control mechanism to conduct fresh fluid;
   a third conduit adapted to fluidly couple a one of the at least a pair of inlet ports of the flow control mechanism to the hydraulic system;
   a fourth conduit adapted to fluidly couple another one of the at least a pair of inlet ports of the flow control mechanism to the hydraulic system, said flow control mechanism aligning the flow of fluid within the hydraulic system with a flow of fluid within the fluid exchange system; and
   a bypass control structure in fluid communication with at least the first conduit and the second conduit, said bypass control structure operatively fluid coupling the first conduit with the second conduit upon a predetermined event.

16. A fluid exchange system according to claim 15, wherein the valve member is a single valve having a pair of passageways therethrough to conduct a flow of fluid.

17. A fluid exchange system according to 16, further comprising:
   a check valve assembly coupled between one of the at least a pair of outlet ports of the flow control mechanism and the receptacle.

18. A fluid exchange system according to claim 15, wherein the separation member is a flexible diaphragm member.

19. A method of exchanging used hydraulic fluid with fresh hydraulic fluid in a hydraulic system having an internal pump and an external fluid cooling circuit, said method comprising the steps of:
   providing a fluid receptacle having a first end and a second end and a movable fluid separation member therebetween, said separation member defining a used fluid portion and a fresh fluid portion within the receptacle;
   coupling the used fluid portion of the receptacle to the hydraulic system;
   coupling the fresh fluid portion of the receptacle to the hydraulic system;
   providing a bypass control assembly in fluid communication with the fluid receptacle;
   allowing the separation member to move within the fluid receptacle as used hydraulic fluid flows from the hydraulic system to the used fluid portion of the receptacle;
   allowing the fresh hydraulic fluid to flow from the fresh fluid portion of the receptacle to the hydraulic system;
   detecting the presence of the separation member proximate to the first end of the fluid; and
   bypassing the used fluid from being introduced into the used fluid portion of the receptacle.

20. A method of exchanging used hydraulic fluid with fresh hydraulic fluid in a hydraulic system having an internal pump and an external fluid cooling circuit, said method comprising the steps of:
   providing a fluid receptacle having a first end and a second end and a movable fluid separation member therebetween, said separation member defining a used fluid portion and a fresh fluid portion within the receptacle;
   coupling the used fluid portion of the receptacle to the hydraulic system;
   coupling the fresh fluid portion of the receptacle to the hydraulic system;
   providing a control assembly defining a bypass assembly, said bypass assembly including an actuatable slide member, at least a portion of said actuatable slide member being disposed within the receptacle;

allowing the separation member to move within the fluid receptacle as used hydraulic fluid flows from the hydraulic system to the used fluid portion of the receptacle;

allowing the fresh hydraulic fluid to flow from the fresh fluid portion of the receptacle to the hydraulic system;

allowing the separation member to slidably move the slide member; and establishing a bypass circuit wherein the receptacle is uncoupled from the hydraulic system upon a movement of the slide member.

21. A fluid exchange system for use in exchanging a used fluid with a fresh fluid in a hydraulic system having a cooling circuit operatively connected to conduct a circulated fluid therein the hydraulic system, said used fluid initially being contained within said fluid cooling circuit, said fluid exchange system comprising:

a fluid receptacle having a separation member therein; said separation member being movable to define a fresh fluid portion of the fluid receptacle and a used fluid portion of the fluid receptacle;

a first conduit adapted to fluidly couple the used fluid portion of the receptacle to the cooling circuit; and a second conduit adapted to fluidly couple the fresh fluid portion of the receptacle to the cooling circuit;

a bypass control assembly, at least a portion of which is disposed within the fluid receptacle, said portion being movable in response to a change in a position of the separation member, said bypass control establishing a bypass mode of operation in which the first conduit is fluidly coupled to the second fluid conduit.

* * * * *